United States Patent [19]

Blanchard

[11] 4,400,163

[45] Aug. 23, 1983

[54] MARINE PROPULSION DEVICE INCLUDING AN OVERDRIVE TRANSMISSION

[75] Inventor: Clarence E. Blanchard, Kenosha, Wis.

[73] Assignee: Outboard Marine Corporation, Waukegan, Ill.

[21] Appl. No.: 319,088

[22] Filed: Nov. 6, 1981

Related U.S. Application Data

[63] Continuation of Ser. No. 12,385, Feb. 15, 1979, Pat. No. 4,323,354, Ser. No. 92,551, Nov. 8, 1979, Pat. No. 4,331,432, and Ser. No. 158,118, Jun. 11, 1980, Pat. No. 4,343,612.

[51] Int. Cl.³ .............................................. B63H 5/13
[52] U.S. Cl. ........................................ 440/75; 74/368
[58] Field of Search .............................. 440/75, 900; 74/333–335, 337.5, 361–363, 366–369, 371–372

[56] References Cited

U.S. PATENT DOCUMENTS

| | | | |
|---|---|---|---|
| 1,795,135 | 3/1931 | Molly | 74/336 |
| 1,979,077 | 10/1934 | Pilaar | 74/336 |
| 2,534,134 | 12/1950 | Kirkpatrick | 74/368 |
| 2,861,461 | 11/1958 | Kreidler | 74/371 |
| 3,372,601 | 3/1968 | Orcutt et al. | 74/368 |
| 3,532,068 | 10/1970 | Lamburn | 440/75 |
| 4,173,939 | 11/1979 | Strang | 440/75 |

*Primary Examiner*—Trygve M. Blix
*Assistant Examiner*—Jesús D. Sotelo
*Attorney, Agent, or Firm*—Michael, Best & Friedrich

[57] ABSTRACT

The overdrive transmission for a marine propulsion device includes a first drive gear mounted for common rotation with an input shaft connected to a power source, such as an internal combustion engine, a first driven gear mounted for common rotation with a drive shaft drivingly connected to a propeller shaft carrying a propeller, and one-way, overrunning clutch connecting the input and drive shafts. The first drive gear meshes with a second driven gear having fewer gear teeth than the first drive gear and mounted on a counter shaft for common rotation therewith. The first driven gear meshes with a second drive gear mounted on the counter shaft for rotation relative thereto. The counter shaft is selectively drivingly connected to the second drive gear to drive the drive shaft at a rotational speed higher than that of the input shaft.

8 Claims, 3 Drawing Figures

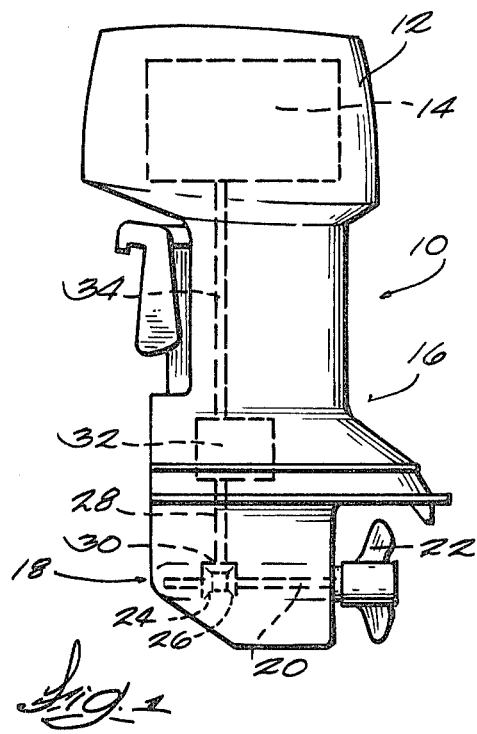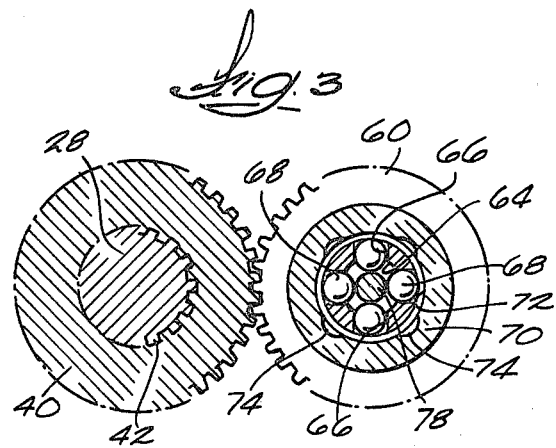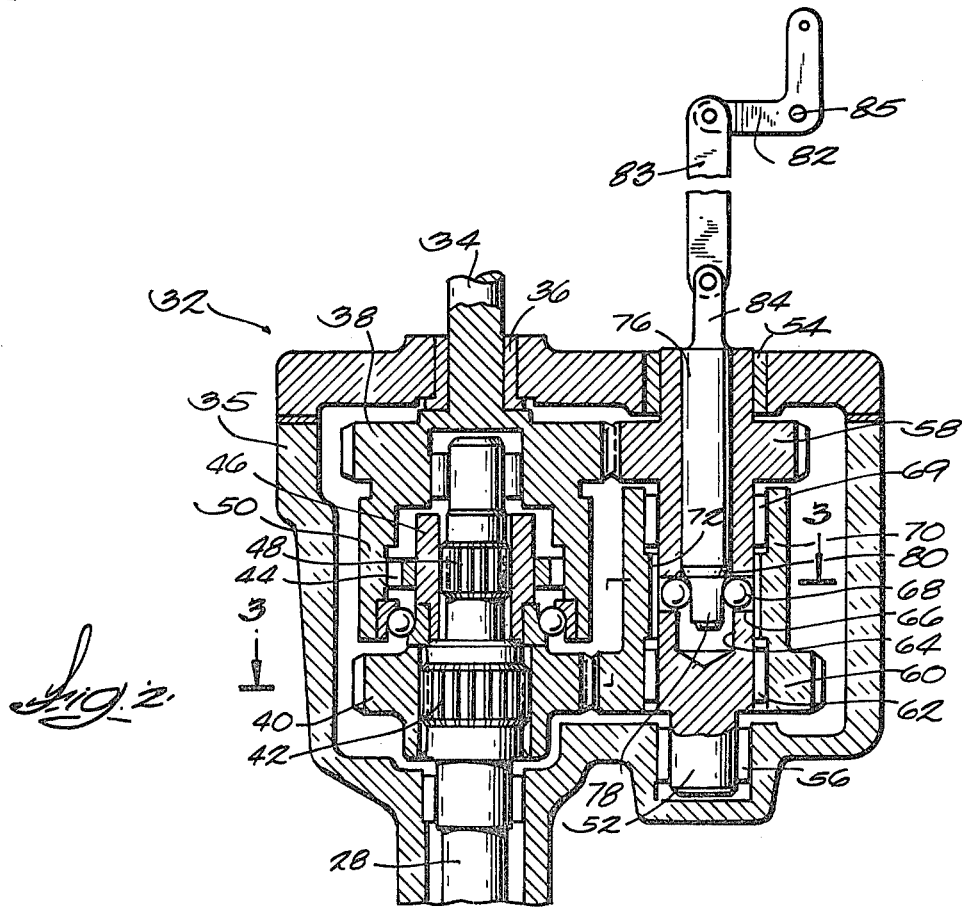

MARINE PROPULSION DEVICE INCLUDING AN OVERDRIVE TRANSMISSION

CROSS REFERENCE TO RELATED APPLICATIONS

This is a continuation of Application Ser. No. 012,385, filed Feb. 15, 1979 now U.S. Pat. No. 4,323,354, Application Ser. No. 092,551, filed Nov. 8, 1979, now U.S. Pat. No. 4,331,432 and Application Ser. No. 158,118, filed June 11, 1980 now U.S. Pat. No. 4,343,612, all of which applications are incorporated herein by reference.

BACKGROUND OF THE INVENTION

The invention relates to transmissions and, more particularly, to overdrive transmissions for marine propulsion devices and the like.

With increasing horsepower of marine propulsions devices, such as outboard motors and stern drive units, the use of an overdrive unit becomes more desirable to improve fuel economy, engine life, lower unit life, and overall performance. A lower pitch propeller can be used for acceleration and, after the boat is planing, an overdrive can be activated to permit the engine speed to be lowered without decreasing the propeller speed. Higher drive shaft speeds made possible when operating in the overdrive mode result in lower torque loading between the drive gear on the drive shaft and the pinion gears on the propeller shaft with an increase in the life of the lower unit and fuel economy.

Examples of other constructions of multi-speed transmissions are disclosed in the following United States patents:

| U.S. Pat. | U.S. Pat. No. | ISSUE DATE |
| --- | --- | --- |
| Molly | 1,795,135 | March 3, 1931 |
| Pilaar | 1,979,077 | Oct. 30, 1934 |
| Kohr | 2,466,318 | April 5, 1949 |
| Kreidler | 2,861,461 | Nov. 25, 1958 |
| Halberg et al. | 3,129,602 | April 21, 1964 |
| Orcutt et al. | 3,372,601 | March 12, 1968 |
| Avramidis et al. | 3,884,097 | May 20, 1975 |
| Strang | 4,173,939 | Nov. 13, 1979 |

SUMMARY OF THE INVENTION

The invention provides a marine propulsion device, such as an outboard motor or a stern drive unit, including an overdrive transmission which is shiftable between a first position wherein a power or input shaft is drivingly connected directly to an output or drive shaft and a second position wherein the drive shaft is driven at a rotational speed higher than the rotational speed of the input shaft through a gear chain including a first drive gear mounted for common rotation with the input shaft, the first driven gear mounted for common rotation with the drive shaft, a second driven gear meshing with the first drive gear, and a second drive gear meshing with the first driven gear and selectively drivingly connected to the second driven gear.

More specifically, the invention provides a marine propulsion device including a rotatable input shaft drivingly connected to a power source, a drive shaft housed in a lower unit and drivingly connected to a propulsion shaft carrying a propeller, and transmission drivingly connecting the input shaft to the drive shaft. The transmission includes a first drive gear mounted for common rotation with the input shaft, a first driven gear mounted for common rotation with the drive shaft and for rotation coaxially with and independently of the input shaft, clutch means drivingly connecting the input shaft to the drive shaft for affording common rotation of the input and drive shafts in one rotary direction and for permitting rotation of the drive shaft relative to the input shaft when the drive shaft is driven in that rotary direction at a rate of rotation higher than that of the first drive gear, a second driven gear meshing with the first drive gear, a second drive gear mounted for rotation coaxially with and relative to the second driven gear and meshing with the first driven gear, and actuating means operably connected between the second driven gear and the second drive gear and movable between a first position wherein the second driven gear and the second drive gear are freely rotatable relative to each other and a second position wherein a driving connection is established between the second driven gear and the second drive gear. The gear ratios of the gears are such that the drive shaft is driven at a rotational speed greater than that of the input shaft when the second drive gear and the second driven gear are drivingly connected.

In one embodiment, the transmission includes a rotatable counter shaft axially offset from the input and drive shafts and having an axially extending bore, the second driven shaft is mounted on the counter shaft for common rotation therewith, and the second drive gear is mounted on the counter shaft for rotation relative thereto. The actuating means includes a selector shaft carried in the counter bore and is axially shiftable therein between the first and second positions, means for drivingly connecting the counter shaft with the second drive gear when the selector shaft is shifted to the second position, and means for selectively shifting the selector shaft between the first and second positions.

In one embodiment, the transmission includes an axially extending sleeve member connected to the second drive gear for common rotation therewith and surrounding the counter shaft, a plurality of circumferentially-spaced recesses in the inner surface of the sleeve member, a plurality of circumferentially-spaced, radially extending passages in the counter shaft registrable with the recesses, and a connecting element adapted to drivingly engage a recess disposed in each of the passages and movable therein between a retracted position disengaged from the recesses and an extended position in driving engagement with recesses. In addition, the selector shaft is arranged to move the connecting elements to the extended position in response to movement of the selector shaft to the second position and to permit the connecting element to return to the retracted position in response to movement of the selector shaft to the first position.

One of the principal features of the invention is the provision of marine propulsion device including an inexpensive, compact overdrive transmission which can be shifted, after the boat is planing, to provide higher propeller speed at a lower torque conditions without increasing engine speed.

Another of the principal features of the invention is the provision of a simply constructed overdrive transmission which is particularly adaptable for a marine propulsion device and can be conveniently shifted to increase the rotational speed of the output or drive shaft without increasing the speed of the input shaft.

Other features, aspects and advantages of the invention will become apparent to those skilled in the art upon reviewing the following detailed description, the drawing and the appended claims.

BRIEF DESCRIPTION OF THE DRAWING

FIG. 1 is a side elevational view of an outboard motor incorporating various of the features of the invention.

FIG. 2 is an enlarged, cross sectional view of the overdrive transmission of the outboard motor shown in FIG. 1.

FIG. 3 is a view taken generally along line 3—3 in FIG. 2.

Before explaining at least one of the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

While the invention will be described for use in an outboard motor, it can be adapted for use in other marine propulsion devices, such as stern drive units, and other similar applications.

Illustrated in FIG. 1 is an outboard motor 10 including a power head 12 housing an internal combustion engine 14 and a lower unit 16 having gear case 18 which is normally under water. Rotatably mounted in the gear case 18 is a propeller shaft 20 carrying, on the outer end, a propeller 22. Located within the gear case 18 is a pair of facing, axially-spaced bevel gears 24 and 26 which are carried by and drivingly connectable to the propeller shaft 20.

Extending through the lower unit 16 transversely to the propeller shaft 20 is a rotatably mounted drive shaft 28 carrying a beveled drive gear 30 which meshes with the gears 24 and 26. The drive shaft 28 is drivingly connected to the engine 14 through an overdrive transmission designated generally by the reference numeral 32.

The transmission 32 includes a power or input shaft 34 which is rotatably mounted in a housing 35, via a bearing 36, coaxially with the drive shaft 28 and which is drivingly connected to the engine 14. The transmission 32 also includes a first drive gear 38 mounted for common rotation with the input shaft 34 and a first driven gear 40 which is mounted on a spline portion 42 of the drive shaft 28 for common rotation therewith and also mounted for rotation coaxially with and independently of the input shaft 34.

The input shaft 34 is drivingly connected to the drive shaft 28 by a one-way, overrunning "sprag" clutch 44. The clutch 44 is disposed between a clutch hub 46 which is mounted on a spline portion 48 on the end of the drive shaft 28 for common rotation with the drive shaft 28 and a clutch drum 50 which surrounds the clutch hub 46 in spaced relationship and is mounted for common rotation with the first drive gear 38. The clutch 44 permits the input shaft 34 to drive the driveshaft 28 in one rotary direction and permits the drive shaft 28 to become free wheeling relative to the input shaft 34 when the rotational speed of the drive shaft 28 exceeds the rotational speed of the input shaft 34 in the same rotary direction, i.e., when the drive shaft 28 overruns the input shaft 34.

The transmission 32 further includes a counter shaft 52 which is axially offset from the drive shaft 28 and the input shaft 34 and which is rotatably journaled in a pair of bearings 54 and 56. A second driven gear 58 which meshes with the first drive gear 38 is mounted on the counter shaft 52 for common rotation therewith. A second drive gear 60 which meshes with the first driven gear 40 is mounted on the counter shaft 52 for rotation relative to the counter shaft 52 via bearing 62. The gear ratios of the first drive gear 38, the second driven gear 58, the second drive gear 60 and the first driven gear 40 are such that the drive shaft 28 is driven at a rotational speed greater than that of the input shaft 34 when the second driven gear 58 and the second drive gear 60 are drivingly connected together. In the specific embodiment illustrated, the first drive gear 38 has a greater number of gear teeth than the second driven gear 58.

During normal operation, the input shaft 34 drives the driveshaft 28 at the same rotational speed as that of the input shaft 34 via the overrunning "sprag" clutch 44 and the first drive gear 38 rotates the counter shaft 52 via the second driven gear 58 at a rotational speed higher than that of the input shaft 34 because the first drive gear 38 has a greater number of gear teeth than the second driven gear 58. At the same time, the counter shaft 52 rotates independently of the second drive gear 60 which is being rotated by the first driven gear 40.

Actuation means are provided for selectively drivingly connecting the counter shaft 52 with the second drive gear 60 so that the drive shaft 28 can be driven at a rotational speed higher than that of the input shaft 34. In the specific embodiment illustrated, such means includes a longitudinally or axially extending bore 64 in the counter shaft 52, a plurality of circumferentially-spaced, radially extending bores or passages 66 opening into the axial bore 64, and a connecting element in the form of a ball 68 disposed in each passage 66. Mounted for common rotation with the second drive gear 60 and for rotation relative to the counter shaft 52 via a bearing 69 is a sleeve member 70 having an inner surface 72 surrounding and spaced closely adjacent the counter shaft 52. The inner surface 72 of the sleeve member 70 has a plurality of circumferentially-spaced identations or recesses 74 which are registrable with the counter shaft passages 66 and are adapted to receive the balls 68. The counter shaft 52 can be drivingly connected to the second drive gear 60 by displacing the balls 68 radially outwardly into engagement with the recesses 74 of the sleeve member 70.

Means are provided for selectively displacing the balls 68 into driving engagement with sleeve member recesses 74. In the specific embodiment illustrated, such means includes a plunger or selector shaft 76 carried in the counter shaft bores 66 for relative axial movement therein. The selector shaft 76 has a reduced end portion 78 and a frusto-conical portion 80 adjacent the reduced end portion 78.

When the selector shaft 76 is in a first or non-connecting position illustrated in FIGS. 2 and 3, the balls 68 are supported on the reduced end portion 78 of the selector shaft 76 and are retracted inside the passages 66 out of engagement with the sleeve member recesses 74. When the selector shaft 76 is shifted axially (downwardly as viewed in FIG. 2) to a second or connecting position, the frusto-conical portion 80 engages the balls 68 and forces them radially outwardly into driving engagement with the sleeve member recesses 74.

The selector shaft 76 is shifted between the non-connecting and connecting positions by reciprocal pivotal movement of a bell crank 82 pivotally connected to a link 83 which, in turn, is pivotally connected to the outer end 84 of the selector shaft 76. Pivotal movement of the bell crank 82 about its pivot point 85 can be effected by various suitable electromechanical, mechanical, or hydraulic-actuated means. Thus, the selector shaft 76 is shifted, in response to counter clockwise movement of the bell crank 82, from the nonconnecting position illustrated in FIG. 2 to the connecting position wherein the frusto-conical portion 80 forces the ball 68 into the sleeve member recesses 74. When this occurs, the drive shaft 82 is driven at a rotational speed greater than that of the input shaft 34 via a gear train including the first drive gear 38, the second driven gear 58, the second drive gear 60, and the first driven gear 40. When the selector shaft 76 is shifted back to the non-connecting position, in response to clockwise movement of the bell crank 82, the drive shaft 28 is driven at the same rotational speed as that of the input shaft 34 via the overrunning "sprag" clutch 44 as described above.

Alternately, the second driven gear 58 can be mounted for rotation relative to the counter shaft 52 and include the sleeve member 70, the second drive gear 60 mounted for common rotation with the counter shaft 52 and the selector shat 56 arranged to selectively connect the counter shaft 52 to the second driven gear 58.

Various of the features of the invention are set forth in the following claims:

I claim:

1. A marine propulsion device including a rotatably mounted input shaft drivingly connected to a power source, a lower unit housing a drive shaft, a propeller shaft rotatably mounted in said lower unit and carrying a propeller, means drivingly connecting said drive shaft to said propeller shaft, and a transmission drivingly connecting said input shaft to said drive shaft, said transmission including a first drive gear mounted for common rotation with said input shaft, a first driven gear mounted for common rotation with said drive shaft and for rotation coaxially with and independently of said input shaft, clutch means drivingly connecting said input shaft to said drive shaft for affording common rotation of said input and drive shafts in one rotary direction and for permitting rotation of said drive shaft relative to said input shaft when said drive shaft is driven in said rotary direction at a rate of rotation higher than that of said input shaft, a second driven gear meshing with said first drive gear, a second drive gear mounted for rotation coaxially with and relative to said second driven gear and meshing with said first driven gear, the gear ratios of said gears being such that said drive shaft is driven at a rotational speed higher than said input shaft when said second driven gear and said second drive gear are drivingly connected together, and actuating means operably connected between said second driven gear and said second drive gear and movable between a first position wherein said second driven gear and said second drive gear are freely rotatable relative to each and a second position wherein a driving connection is established between said second driven gear and said second drive gear.

2. A marine propulsion device according to claim 1 wherein said clutch means comprises a one-way, overrunning clutch.

3. A marine propulsion device according to claim 1 wherein said transmission further includes a rotatably mounted counter shaft axially offset from said input shaft and said drive shaft and having an axially extending bore, wherein said second driven gear is mounted on said counter shaft for common rotation therewith and said second drive gear is mounted on said counter shaft for rotation relative thereto, wherein said actuating means comprises a selector shaft carried in said bore and axially shiftable therein between said first and second positions, means for drivingly connecting said counter shaft with said second drive gear when said selector shaft is shifted to said second position, and means for selectively shifting said selector shaft between said first and second positions.

4. A marine propulsion device according to claim 3 wherein said means for drivingly connecting said counter shaft with said second drive gear includes an axially extending sleeve member connected to said second drive gear for common rotation therewith and having an inner surface surrounding and spaced closely adjacent said counter shaft, a plurality of circumferentially-spaced recesses in said sleeve member inner surface, a plurality of circumferentially-spaced, radially extending passages in said counter shaft opening into said bore and registrable with said recesses, a plurality of connecting elements each adapted to drivingly engage one of said recesses and disposed in a respective one of said passages and movable therein between a retracted position disengaged from said recesses and an extended position in driving engagement with one of said recesses, and means on said selector shaft for moving said connecting elements outwardly to said extended position in response to movement of said selector shaft to said second position and for permitting said connecting elements to return to said retracted position in response to movement of said selector shaft to said first position.

5. A transmission including a rotatably mounted input shaft, a drive shaft mounted for rotation coaxially with and independently of said input shaft, a first drive gear mounted for common rotation with said input shaft, a first driven gear mounted for common rotation with said drive shaft, clutch means drivingly connecting said input shaft to said drive shaft for affording common rotation of said input shaft and said drive shaft in one rotary direction and for permitting rotation of said drive shaft relative to said input shaft when said drive shaft is driven in said rotary direction at a rate of rotation higher than that of said input shaft, a second driven gear meshing with said first drive gear, a second drive gear mounted for rotation coaxially with and relative to said second driven gear and meshing with said first driven gear, the gear ratios of said gears being such that said drive shaft is driven at a rotational speed greater than that of said input shaft when said second driven gear and said second drive gear are drivingly connected together, and actuating means operably connected between said second driven gear and said second drive gear and movable between a first position wherein said second driven gear and said second drive gear are freely rotatable relative to each other and a second position wherein a driving connection is established between said second driven gear and said second drive gear.

6. A transmission according to claim 5 including a rotatably mounted counter shaft axially offset from said input shaft and said drive shaft and having an axially extending bore, wherein said second driven gear is mounted on said counter shaft for common rotation therewith and said second drive gear is mounted on said counter shaft for rotation relative thereto, and wherein said actuating means comprises a selector shaft carried in said bore and axially shiftable therein between said first and second positions, means for drivingly connecting said counter shaft when said second drive gear when said selector shaft is shifted to said second position, and means for selectively shifting said selector shaft between said first and second positions.

7. A transmission according to claim 5 wherein said clutch means comprises a one-way, overrunning clutch.

8. A transmission according to claim 6 wherein said means for drivingly connecting said counter shaft with said second drive gear includes an axially extending sleeve member connected to said second drive gear for common rotation therewith and for rotation relative to said counter shaft, said sleeve member having an inner surface surrounding and spaced closely adjacent said counter shaft, a plurality of circumferentially-spaced recesses in said sleeve member inner surface, a plurality of circumferentially-spaced, radially extending passages in said counter shaft opening into said bore and registrable with said recesses, a plurality of connecting elements, each adapted to drivingly engage one of said recesses and disposed in a respective one of said passages and movable therein between a retracted position disengaged from said recesses and an extended position in driving engagement with one of said recesses, and means on said selector shaft for moving said connecting elements outwardly to said extended position in response to movement of said selector shaft to said second position and for permitting said connecting elements to return to said retracted position in response to movement of said selector shaft to said first position.

* * * * *

UNITED STATES PATENT AND TRADEMARK OFFICE
CERTIFICATE OF CORRECTION

PATENT NO. : 4,400,163
DATED : August 23, 1983
INVENTOR(S) : Clarence E. Blanchard It is certified that error appears in the above-identified patent and that said Letters Patent are hereby corrected as shown below:

Column 7, line 11, "when" should be -- with --.

Signed and Sealed this

Seventeenth Day of September 1985

[SEAL]

Attest:

DONALD J. QUIGG

Attesting Officer

Commissioner of Patents and
Trademarks—Designate